United States Patent
Beysserie et al.

(10) Patent No.: US 9,413,963 B2
(45) Date of Patent: Aug. 9, 2016

(54) VIDEO IMAGE STABILIZATION

(71) Applicant: Apple Inc., Cupertino, CA (US)

(72) Inventors: Sebastien X. Beysserie, Milpitas, CA (US); Damien J. Thivent, Santa Clara, CA (US); Jianping Zhou, Fremont, CA (US); Rudolph van der Merwe, Portland, OR (US); Jason Klivington, Portland, OR (US); Xiaoxing Li, San Jose, CA (US); Anders Holtsberg, Los Gatos, CA (US); Martin Lindberg, Los Altos, CA (US); George E. Williams, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/467,987

(22) Filed: Aug. 25, 2014

(65) Prior Publication Data

US 2015/0350548 A1 Dec. 3, 2015

Related U.S. Application Data

(60) Provisional application No. 62/005,983, filed on May 30, 2014.

(51) Int. Cl.
*H04N 5/232* (2006.01)
*G06T 5/00* (2006.01)
*G06T 7/00* (2006.01)

(52) U.S. Cl.
CPC ............ *H04N 5/23267* (2013.01); *G06T 5/003* (2013.01); *G06T 7/0038* (2013.01); *G06T 2207/10016* (2013.01); *G06T 2207/20201* (2013.01)

(58) Field of Classification Search
CPC .......... H04N 5/23248; H04N 5/23251; H04N 5/23254; H04N 5/23258; H04N 5/23261; H04N 5/23264; G06T 7/0038; G06T 2207/10016; G06T 2207/20201
See application file for complete search history.

(56) References Cited

U.S. PATENT DOCUMENTS 7,359,563 B1 4/2008 Dua
7,817,187 B2 10/2010 Silsby
(Continued)

FOREIGN PATENT DOCUMENTS

WO 2014147285 A1 9/2014

OTHER PUBLICATIONS

Zhou, et al., "Video Rolling Shutter Correction for Lens Movement in Optical Image Stabilization Cameras," U.S. Appl. No. 14/547,107, filed Nov. 18, 2014.

*Primary Examiner* — Christopher K Peterson
(74) *Attorney, Agent, or Firm* — Blank Rome LLP

(57) ABSTRACT

Techniques to permit a digital image capture device to stabilize a video stream in real-time (during video capture operations) are presented. In general, techniques are disclosed for stabilizing video images using an overscan region and a look-ahead technique enabled by buffering a number of video input frames before generating a first stabilized video output frame. (Capturing a larger image than is displayed creates a buffer of pixels around the edge of an image; overscan is the term given to this buffer of pixels.) More particularly, techniques are disclosed for buffering an initial number of input frames so that a "current" frame can use motion data from both "past" and "future" frames to adjust the strength of a stabilization metric value so as to keep the current frame within its overscan. This look-ahead and look-behind capability permits a smoother stabilizing regime with fewer abrupt adjustments.

18 Claims, 8 Drawing Sheets

(56) References Cited

U.S. PATENT DOCUMENTS

| | | |
|---|---|---|
| 8,335,350 B2 | 12/2012 | Wu |
| 8,520,084 B2 | 8/2013 | Tsai |
| 8,711,233 B2 | 4/2014 | Jefremov |
| 8,749,644 B2 | 6/2014 | Lee |
| 8,947,529 B2 | 2/2015 | Strine |
| 9,100,575 B2 | 8/2015 | Lee |
| 2011/0096179 A1 | 4/2011 | Border |
| 2011/0234825 A1* | 9/2011 | Liu .................. H04N 5/23248 348/208.5 |
| 2013/0135430 A1* | 5/2013 | Liu .................. G06T 7/0071 348/42 |
| 2013/0141602 A1 | 6/2013 | Kuriyama |
| 2014/0160309 A1 | 6/2014 | Karpenko |

* cited by examiner

VIDEO IMAGE STABILIZATION

BACKGROUND

This disclosure relates generally to the field of digital photography. More particularly, but not by way of limitation, it relates to a technique for stabilizing video frames as they are captured.

A standard rule of thumb for capturing sharp, handheld imagery is that the camera's shutter speed should not be less than its shutter speed equivalent to the focal length of the lens. This rule holds that a 500 millimeter (mm) lens shouldn't be handheld at shutter speeds slower than $\frac{1}{500}$-second, a 300 mm lens slower than $\frac{1}{300}$-second, a 50 mm lens slower than $\frac{1}{50}$-second, and a 20 mm lens slower than $\frac{1}{20}$-second.

With the application of software- and/or hardware-based stabilization technology, jitter caused by camera movement may be minimized, making it possible to transform shaky, handheld footage into steady, smooth shots. One way to stabilize a video is to track a salient feature in the image and use this as an anchor point to cancel out all perturbations relative to it. This approach requires a priori knowledge of the image's content to, for example, identify and track a person or other salient object in the scene. Another approach to image stabilization searches for a "background plane" in a video sequence, and uses its observed distortion to correct for camera motion. In yet another approach, gyroscopically controlled electromagnets shift a floating lens element orthogonally to the optical axis along the horizontal and vertical plane of the image in a direction that is opposite that of the camera movement. Doing this can effectively neutralize any sign of camera shake. In a similar type of operation, a camera's imaging sensor is translated in the opposite direction of the camera's movements in order to dampen the effects of camera shake.

SUMMARY

In one embodiment the disclosed concepts provide a method to stabilize a video stream as it is being captured. The method includes capturing a first time-sequenced set of images (e.g., a video stream), where each image has a capture time and motion information (the motion information provided by one or more motion sensors such as gyro-sensors or accelerometers). Selecting, from the first time-sequenced set of images, a current image having a capture time that is before the capture time of every image in a second time-sequenced set of images, the second time-sequenced set of images being a subset of the first time-sequenced set of images. Identifying a first stabilization metric value for the current image and applying that stabilization metric value to other images in the second time-sequenced set of images in reverse time order. Determining the first stabilization metric value is not appropriate for a later-captured image from the second time-sequenced set of images Determining a second stabilization metric value for the later-captured image (the first and second stabilization metric values being different). Adjusting the first stabilization metric value based on the second stabilization metric value, the later-captured image's motion information, the current image's motion information, and motion information from one or more other images from the second time-sequenced set of images including the later-captured image. Applying the adjusted first stabilization metric value to the current image thereby stabilizing the current image and, finally, storing the stabilized current image in a memory. A computer executable program to implement the method may be stored in any media that is readable and executable by a computer system.

DETAILED DESCRIPTION

Figure 1A:
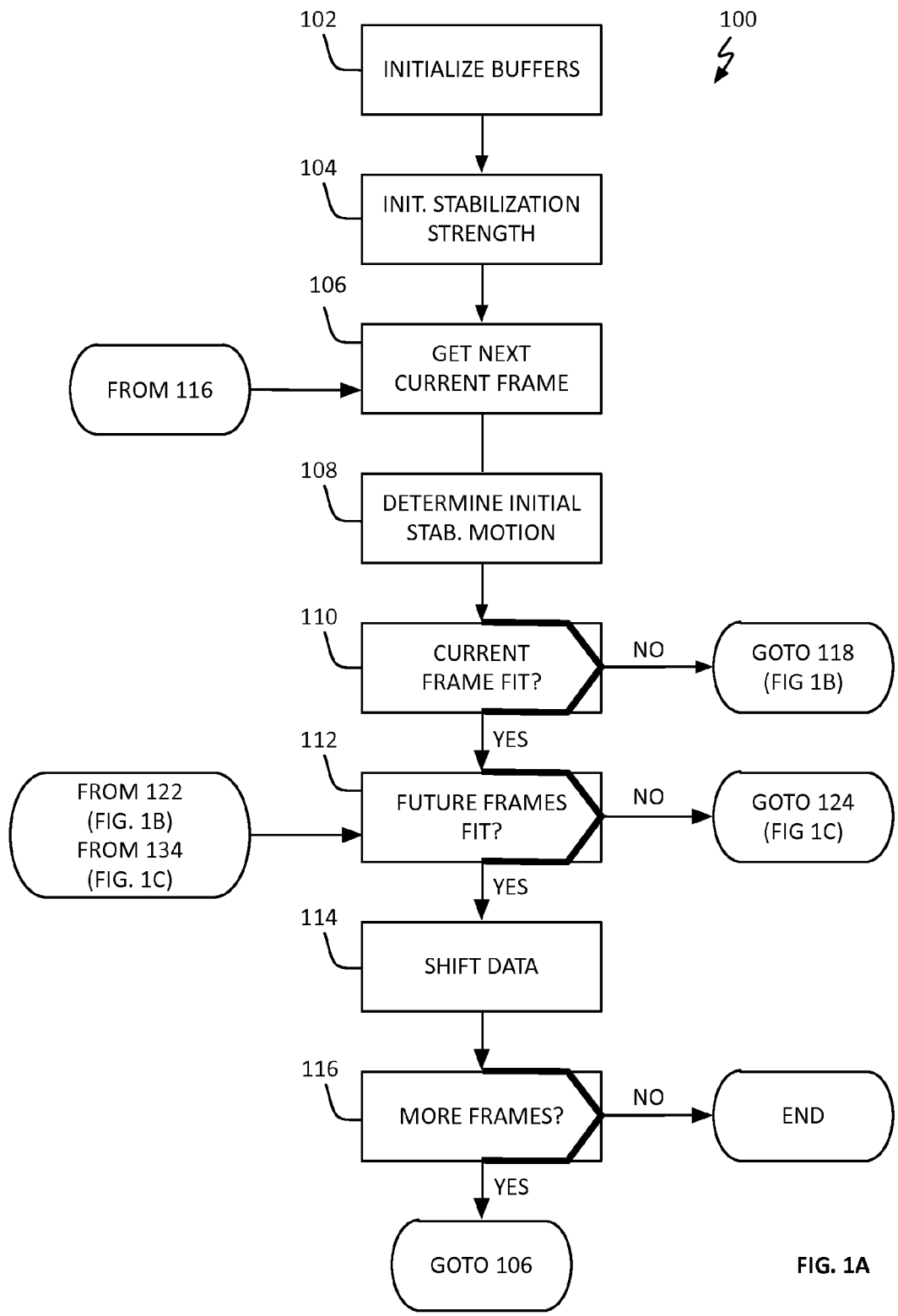
FIGS. 1A-1C show, in flowchart form, a video stabilization operation in accordance with one embodiment.

This disclosure pertains to systems, methods, and computer readable media to stabilize video in real-time (at it is captured). In general, techniques are disclosed for stabilizing video images using an overscan region and a look-ahead technique enabled by buffering a number of video input frames before generating a first stabilized video output frame. (Capturing a larger image than is displayed creates a buffer of pixels around the edge of an image; overscan is the term given to this buffer of pixels.) More particularly, techniques are disclosed for buffering an initial number of input frames so that a "current" frame can use motion data from both "past" and "future" frames to adjust the strength of a stabilization metric value so as to keep the current frame within its overscan. This look-ahead and look-behind capability permits a smoother stabilizing regime with fewer abrupt adjustments.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of video processing systems having the benefit of this disclosure.

One approach to video stabilization that makes use of a variable tuning factor is to first determine what sort of activity is causing the detected camera motion, set the tuning factor accordingly and stabilize in accordance with that value. For example, If no motion is detected it may be possible to classify the "type of motion" as stationary and, as a result, apply very strict stabilization. If, on the other hand, a lot of camera motion is detected along a single axis, it may be possible to classify the type of motion as strolling at which point a different stabilization tuning factor may be applied. The approach described herein monitors the motion of each frame, adjusting a stabilization tuning factor based on that motion and the motion of a specified number of future and past frames. More specifically, video stabilization operations in accordance with this disclosure buffer some number of incoming video frames, delaying the production of stabilized video output frames by the time required to capture these frames. This arrangement permits a "current frame" to use both "future" and "past" motion data. This, in turn, permits stabilization adjustments (the movement of individual frames within their overscan) of a current frame in a way that prepares for, or anticipates, the motion in future frames.

Figure 2A:
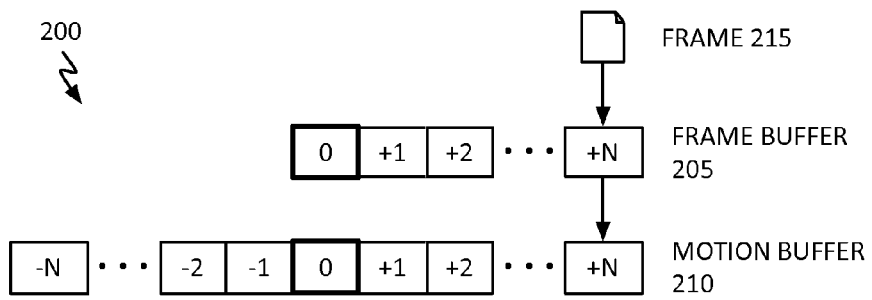
FIGS. 2A and 2B show, in block diagram form, a frame buffer system in accordance with one embodiment.
Figure 2B:
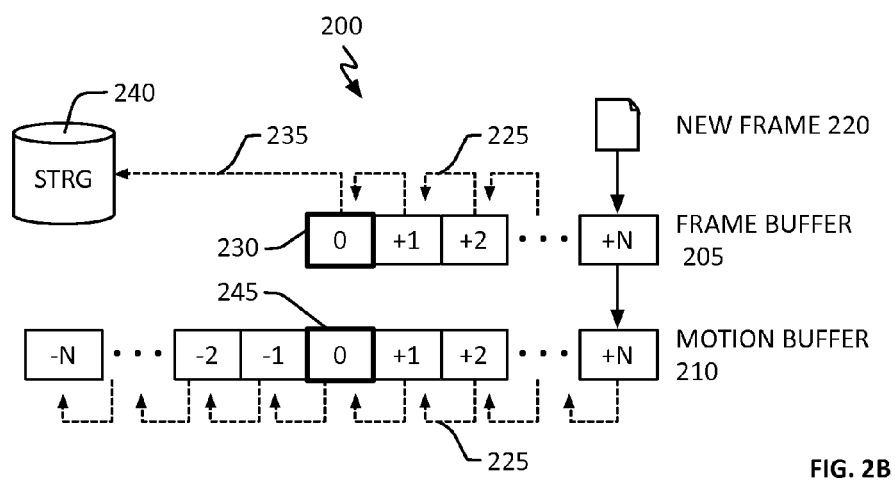

Referring to FIG. 1A, video stabilization operation 100 in accordance with one embodiment begins by initializing a buffer system with an incoming stream of video frames (block 102). From this stream, image data and motion data may be buffered for a specified number of frames before a first stabilized output frame is generated. Referring to FIG. 2A, buffer system 200 in accordance with one embodiment includes (N+1) entry frame buffer 205, and (2N+1) entry motion buffer 210. As each frame 215 arrives, it is placed into the +$N^{th}$ frame buffer entry with the frame's corresponding motion data placed into the +$N^{th}$ motion buffer entry. Frame motion data (e.g., frame metadata) may come from, for example, one or more gyroscopes and/or one or more accelerometers whose output is matched with, or synchronized to, the capture of video frames (e.g., video frame 215). Referring to FIG. 2B, as each new frame 220 arrives at buffer system 200, every entry already in frame buffer 205 and every entry in motion buffer 210 may be shifted to the left by one position as indicated by dotted lines 225. After being stabilized, frames shifted out of frame buffer entry 230 (the $0^{th}$ entry) may be routed 235 to long-term storage 240. Motion data shifted out of motion buffer entry 245 (the $0^{th}$ entry) may be discarded or retained. In buffer system 200, for example, motion buffer 210 includes (2N+1) total entries: N entries corresponding to frames captured before frame and motion entry 230 and 245 respectively (entries having negative prefixes), and N entries corresponding to frames captured after frame and motion entry 230 and 245 respectively (entries having positive prefixes). From the point of view of a frame in entry 230, positive-prefix motion entries correspond to frames captured in the "future" while negative-prefix entries correspond to frames captured in the "past." The difference in time between the capture of a frame placed into the +$N^{th}$ frame buffer entry and generation of a stabilized version of that frame from entry 230 may be thought of as the amount of time stabilization operation 100 looks into the "future." In one embodiment, frame buffer 205 may store a specified number of frames (e.g., 16, 24, 32). Because buffering frames can be expensive in terms of memory (e.g., one frame at 1080p video resolution can be between 2 and 3 megabytes, MB), the optimum size of frame buffer 205 may be dependent upon the available memory, the amount of delay time that is acceptable between initiation of video capture operation 100 and generation of a first stabilized output frame, and the intended use of the image capture device. (The size of motion buffer 210 may be small compared to frame buffer 205 as the only data generally stored there is camera motion data.)

Figure 3:
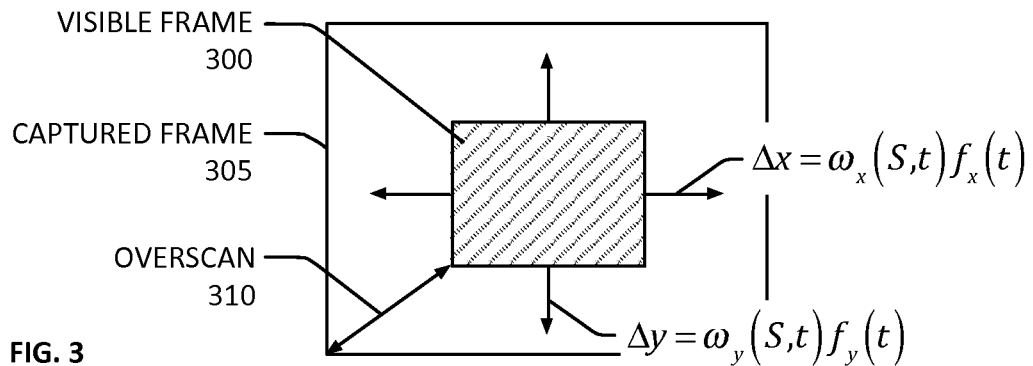
FIG. 3 illustrates the movement that can be applied to a visible region of a frame within its overscan during stabilization operations in accordance with this disclosure.
Figure 4:
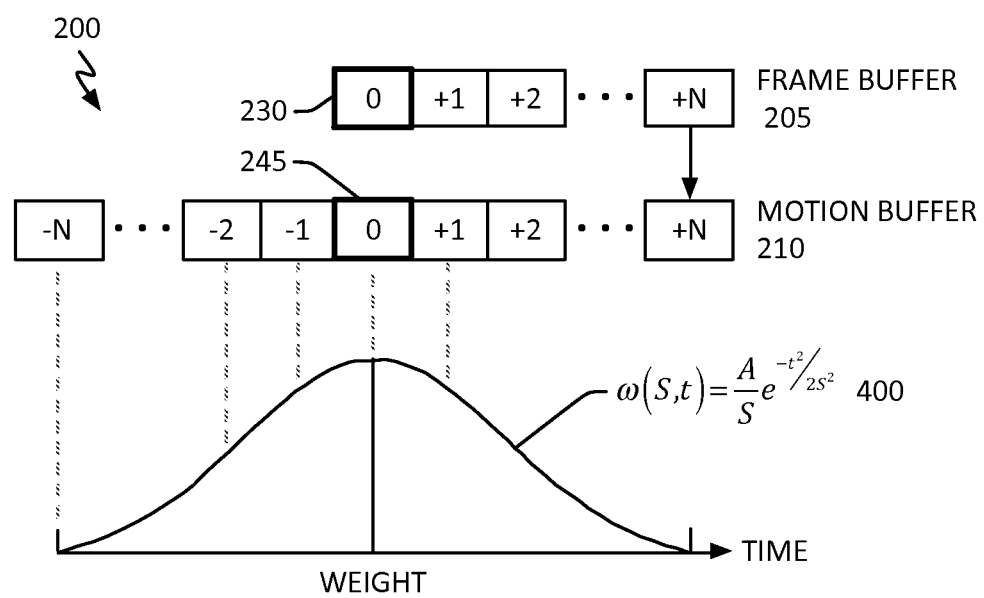
FIG. 4 illustrates a stabilization strength function in accordance with one embodiment.

Returning to FIG. 1A, once frame 205 and motion 210 buffers have been initialized in accordance with block 102, an initial stabilization strength (S) (block 104) and a current frame may be selected (block 106). For the purposes of this disclosure, the "current frame" will be taken as that frame in frame buffer entry 230 (and motion data in motion buffer entry 245). A stabilization strength may be thought of as a value used, in part, to determine a weighting factor used to moderate movement of an image within its overscan region during stabilization operations. Referring to FIG. 3, motion of visible frame 300 within captured frame 305 (the difference being overscan 310) is shown functionally:

$$\Delta x = \omega_x(S,t) f_x(t) \quad \text{EQ. 1A}$$

and $$\Delta y = \omega_y(S,t) f_y(t), \quad \text{EQ. 1B}$$

where $\Delta x$ and $\Delta y$ represent the amount of motion along x and y coordinate axes that the current frame should be moved in accordance with stabilization operation 100, $\omega_x(\ )$ and $\omega_y(\ )$ represent x and y coordinate weighting functions respectively, and functions $f_x(\ )$ and $f_y(\ )$ represent arbitrary movement functions (linear or non-linear) that are up to the discretion of the designer. It should be understood that while EQS. 1A and 1B describe translation only, actual correction may include other axes and other artifacts. For example, in one embodiment video may be stabilized using gyroscope output (represented as quaternions) against rotation, perspective distortion and rolling shutter artifacts. In addition, multiple corrections to an image at various positions of the image's plane may be made rather than a single or global correction described here to deal with rolling shutter artifacts. In short, for each current frame, video stabilization operation 100 determines the smoothed motion sample based on past/future motion data, and determines the correction (difference) that needs to be applied to the motion data to make it equal the smoothed trajectory and, using this information and known camera (e.g., focus) and lens characteristics generates multiple perspective transforms which may then be applied to the image. (The size of overscan 310 has been grossly overstated in FIG. 3 for illustrative purposes. Typical sizes for overscan 310 are between 3% to 10% of a captured frame's horizontal and vertical extent.) In general, stabilization strength S may vary from buffer entry-to-buffer entry and, as a result, weighting values $\omega_x(\ )$ and $\omega_y(\ )$ may also vary from buffer entry-to-buffer entry. Referring to FIG. 4, in one embodiment stabilization strength S may be the standard deviation of weighting kernel function 400 (400 could represent either, or both, $\omega_x(\ )$ and $\omega_y(\ )$ of EQS. 1A and 1B). As shown in illustrative weighting function 400, time may correspond to the buffered motion data's index, positive and negative. By way of example, the weight value assigned to the current entry (time=0, buffer entries 230 and 245) would be the maximum value of function 400 which, for purposes of this disclosure may be taken to be 1.0.

Returning again to FIG. 1A, once buffer system 200 is initialized the current frame's initial stabilization motion (e.g., as provided by EQS. 1A and 1B) may be determined (block 108). For a given stabilization strength S, a frame's $\Delta x$ and $\Delta y$ values are simply functions of time (e.g., motion buffer entry index) as follows:

$$\Delta x = K_x \sum_{t=-(N-1)}^{(N-1)} w(t) f_x(t), \quad \text{EQ. 2A}$$

and $$\Delta x = K_y \sum_{t=-(N-1)}^{(N-1)} w(t) f_x(t), \quad \text{EQ. 2B}$$

where $K_x$ and $K_y$ are constants based on, in part, the current stabilization strength value, $\omega_x(\ )$ and $\omega_y(\ )$ may have a form as shown in FIG. 4, and $f_x(t)$ and $f_y(t)$ are as described above. Based on results given by EQS. 2A and 2B, a test may be made to determine if the current frame remains within its overscan and, if it does (the "YES" prong of block 110), another test may be made to determine if the buffer's future entries also fit (block 112).

A positive response to block 110 means the current frame has been determined to fit within its overscan. The remaining actions of operation 100 seek to predict if the current frame's future frames will fit in their overscan using the same strength parameter. As long as the current stabilization strength value is found to do this, that value is used. When one of the current frame's future frames does not fit in its overscan, the stabilization strength value may be lowered until a value is found that predicts it will fit. (See discussion below regarding blocks 124-136).

If the current frame's future frames also fit within their overscan (the "YES" prong of block 112), the current frame may be updated to account for the determined $\Delta x$ and $\Delta y$ values and then both frame and motion data may be shifted (block 114). As part of the shift process, the current frame may be transferred to storage 240. In one embodiment, the current frame's data may be altered in accordance with calculated $\Delta x$ and $\Delta y$ values prior to shift and store operations 114. In another embodiment, frame metadata may be altered instead. As used here, the term "frame data" refers to image data (e.g., R, G, and B values), whereas the term "frame metadata" or "metadata" refers to any information incorporated into a video/image frame that is not image data. If additional frames remain to be processed (the "YES" prong of block 116), stabilization operation 100 continues at block 106.

Figure 1B:
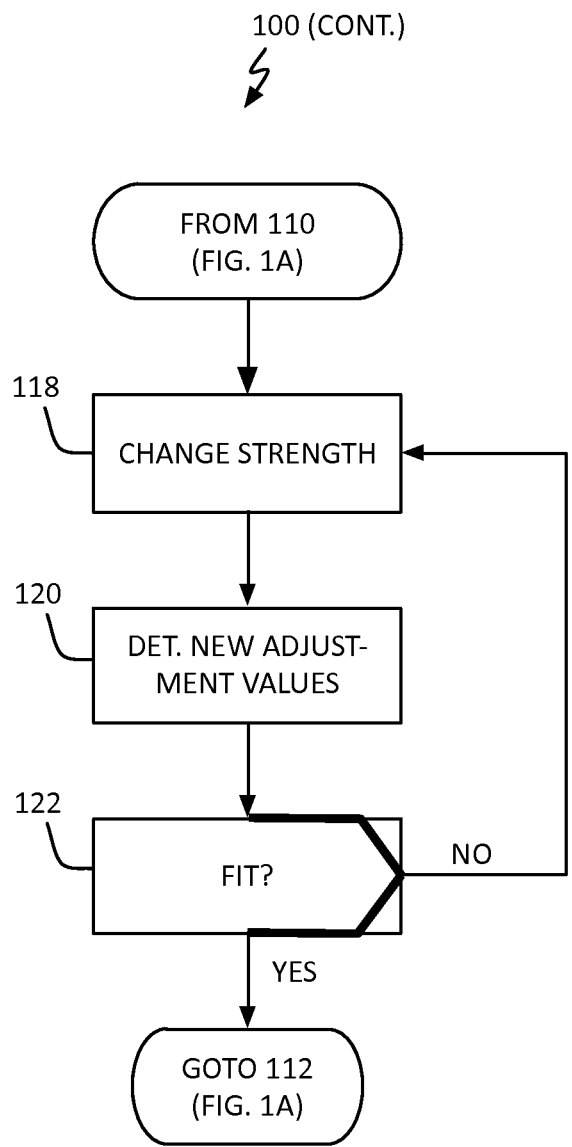

If the current frame's calculated stabilization movements $\Delta x$ and $\Delta y$ do not permit the visible portion of the current frame to remain within its overscan (the "NO" prong of block 110), stabilization operation 100 continues at block 118 in FIG. 1B. Initially, the stabilization strength S may be changed by some amount (block 118). For example, stabilization strength S may be reduced in fixed steps of 0.1. In another embodiment, stabilization strength S may be reduced by a specified percentage of the current value. For example, 10%. Turning again to FIG. 4, it can be seen that decreasing the value of S has the effect of reducing the spread of the weighting kernel function. This, in turn, attributes more weight/significance to those entries closer to the current frame with respect to a weighting function having a larger S value. Based on the new stabilization strength value, EQS. 2A and 2B may be used to determine $\Delta x$ and $\Delta y$ stabilization motion values (block 120). If the new adjustments still do not permit the current frame to fit within its overscan (the "NO" prong of block 122), operation 100 continues at block 118, where actions 118-122 may be repeated until a stabilization strength value is found that permits the current frame to stay within its overscan. If, after calculating stabilization motions in accordance with block 120, the current frame fits within its overscan (the "YES" prong of block 122), operation 100 continues at block 112 in FIG. 1A.

Figure 1C:
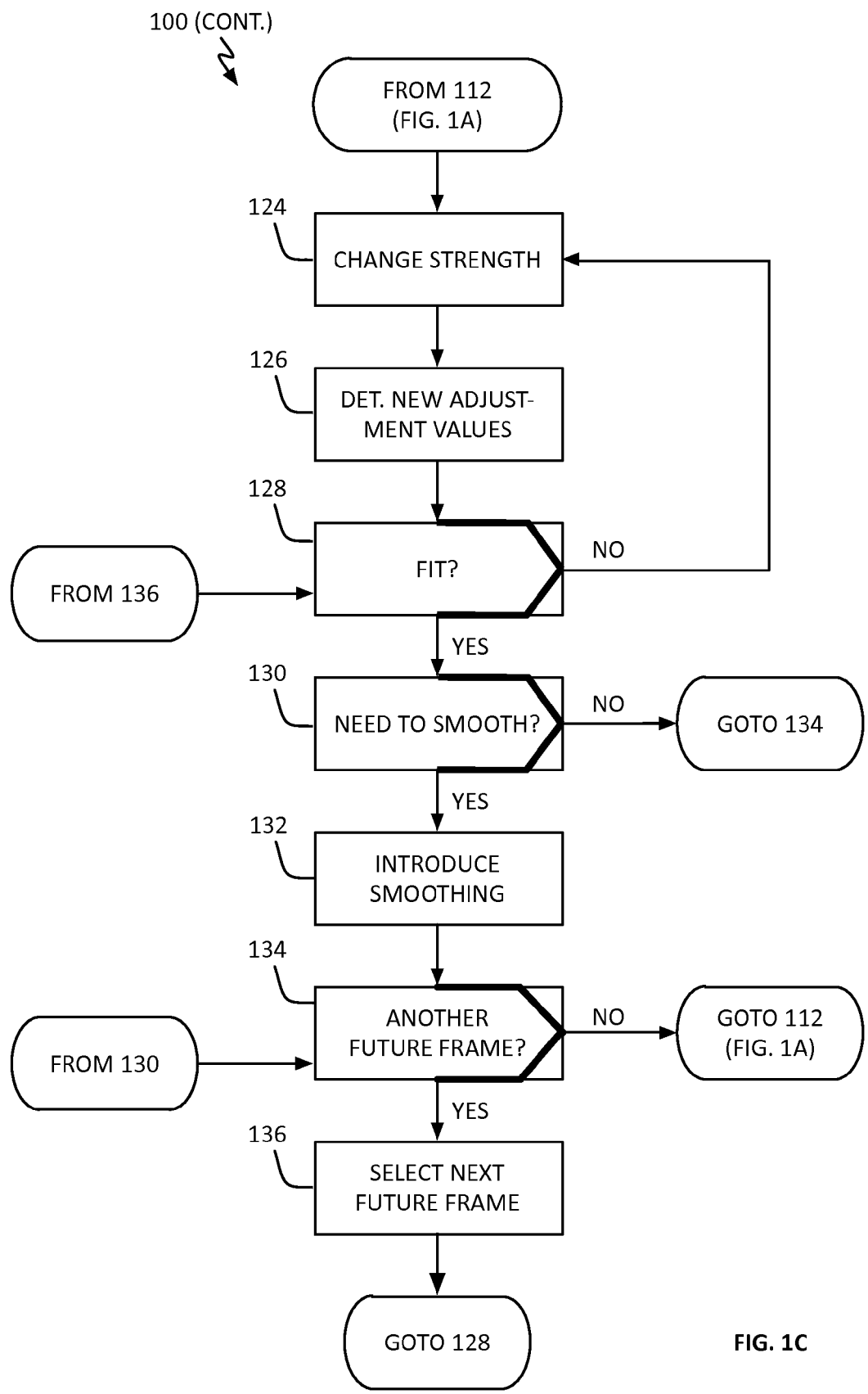
Figure 5A:
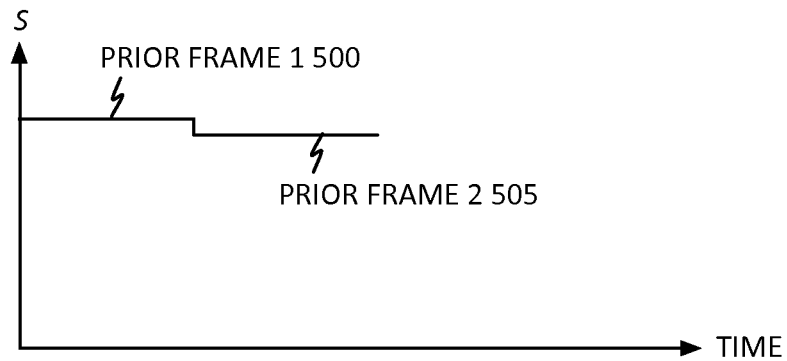
FIGS. 5A and 5B illustrate the use of a smoothing trajectory in accordance with one embodiment.
Figure 5B:
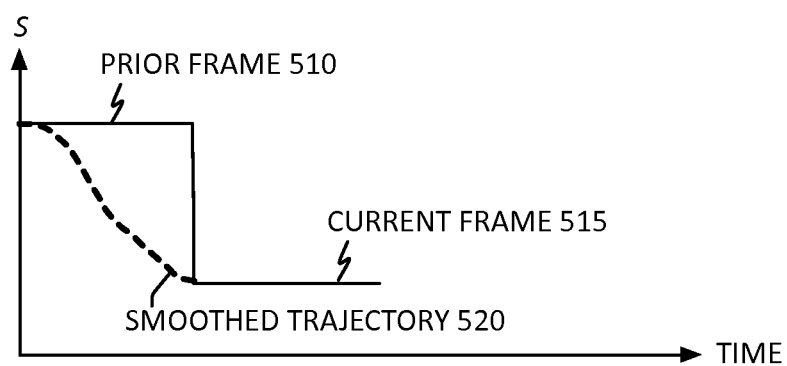

Returning to FIG. 1A, if the current frame's future frames are determined not to fit within their overscan for the given stabilization strength (the "NO" prong of block 112), operation 100 continues at block 124 in FIG. 1C. In general, blocks 124-128 perform as do blocks 118-122. If a future frame is amenable to a higher stabilization strength than its immediately prior frame, actions in accordance with block 124 may increase the stabilization strength value. In general, it has been found advantageous to set a frame's stabilization strength value to as high a value as possible while still respecting the frame's overscan boundary. If, after having its stabilization strength value adjusted, a frame fits within its overscan (the "YES" prong of block 128), another check may be made to determine if its value is such that it may be beneficial to smooth the transition between itself and prior frames (block 130). Referring to FIGS. 5A and 5B, if the stabilization strength difference between frames 500 and 505 is small (the "NO" prong of block 130), no smoothing need take place. If the stabilization strength difference between frames 510 and 515 is large or greater than some threshold—a value up to the designer (the "YES" prong of block 130), a smoothing trajectory such as trajectory 520 may be employed (block 132). It is noted that the shape of smoothing trajectory 520 is only illustrative. The actual shape may be anything that meets the needs and goals of the image capture system. For example, in another embodiment smoothing trajectory 520 could be linear, or could start at a frame other than that shown (e.g., toward the abrupt transition). (It should be understood the "trajectory" of the strength parameter S as described here is a stand-in for the smoothed/stabilized trajectory of the image capture device. One of ordinary skill in the art will understand they are not the same.) As will be discussed in more detail, operation 100's ability to look into the "future" provides it a unique ability to anticipate abrupt movements in the future and begin adjusting the strength value of values before the abruptness occurs so that visible jumps or glitches in the final video sequence may be reduced or eliminated. Next, a check may be made to determine if the current frame (from FIGS. 1A and 1B) has any more future frames (block 134). If additional future frames exist (the "YES" prong of block 134), the next future frame is selected where after operation 100 continues at block 128. If there are no further future frames to evaluate (the "NO" prong of block 134), operation 100 continues at block 112 in FIG. 1A. Returning once more to FIG. 1A, after the current frame has been updated in accordance with stabilization operation 100 and shifted into storage (block 116), if there are no more frames to evaluate (the "NO" prong of block 116), stabilization operation 100 is complete.

Figure 6:
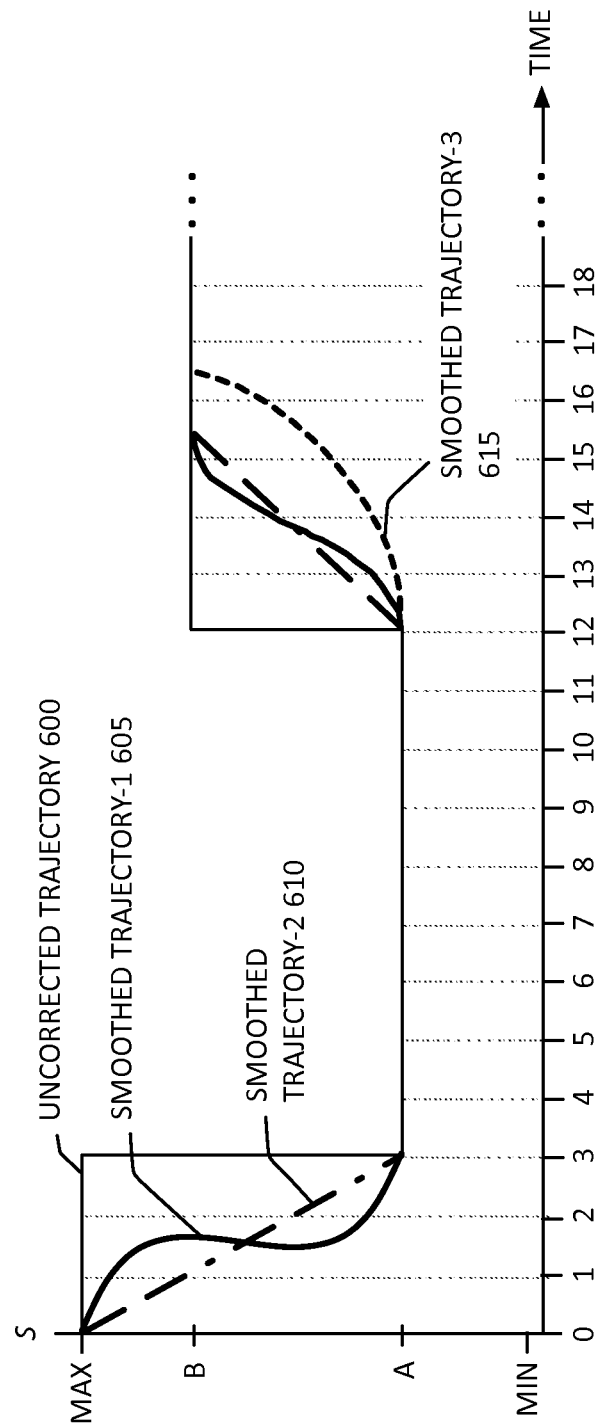
FIG. 6 shows illustrative stabilization strength trajectories in accordance with one embodiment.

To see how stabilization operation 100 may be applied, consider FIG. 6. Uncorrected trajectory 600 represents the change in stabilization weight needed to stabilize a video stream without the benefit of stabilization methods in accordance with this disclosure. The abrupt changes in stabilization weight at t=3 and 12 (necessitated by motion of the image capture device as reflected in frame motion metadata) may cause a visual flicker, jump, or other discontinuity during video stream playback. As will be discussed in more detail below, each of smooth trajectory 1 605 and smooth trajectory 2 610 represent but 2 possible trajectories that may be provided in accordance with operation 100.

At t=0 an initial stabilization strength equal to MAX is found to adequately adjust the current frame (see 102-110). In one embodiment, each frame's initial stabilization weight may be set equal to a maximum value, MAX. In another embodiment, each frame's initial stabilization weight may be set equal to a minimum value, MIN. In yet another embodiment, each frame's initial stabilization weight may be set equal to that of its immediate "past" frame. Following evaluation of the current frame, each of the current frame's buffered "future" frames may be tested to determine what weight they may need to remain stabilized (see 112). This process repeats for each successive future frame until, at t=3 the frame's weight must be reduced to A in order to remain stabilized (see 124-128). Once this is determined, stabilization operation 100 may select any acceptable smoothing function to get from a stabilization strength of MAX at t=0 to a stabilization strength of A at t=3 (see 30-132). In one embodiment, a sigmoidal smoothing function 605 may be selected. In another embodiment, a simple linear smoothing trajectory 605 may be selected. In practice, any smoothing function that smoothens the frame-to-frame adjustment of video images that meets the needs or goals of the system under design may be used. As shown in FIG. 6, the stabilization strength values previously calculated for buffered frames at t=1 and 2 may be changed so as to accommodate the selected smoothing regime. Once a smoothed trajectory has been selected and a stabilization weight determined at t=3, evaluation of the current frame's future buffers continues (see 106-112) until at t=12 when another abrupt change is detected (indicative of the image capture device being moved abruptly) motion may be evaluated. While the operation of generating smoothed trajectories 605 and 610 at t=12 is similar to that discussed above, increasing the stabilization strength can require the consideration of additional factors. First, a change from 1 to 2 represents a much larger change than a change from 10 to 9 or 9 to 10. To address this issue, it has been found beneficial to increase the stabilization strength slowly such as shown in smoothed Trajectory 3 615. While virtually any function may be used, trajectory 615 illustrates a %-increase regime, where each increment is a specified percentage of the prior value. By way of example, if the %-increase quota is 10% and the current value is 1, the next value would be 1.1. If the current value is 10, the next value would be 11. It is noted, a falling stabilization strength value is more difficult to accommodate than a rising value. When ramping down, a value certain must be reached within a given window to avoid creating a visual aberration. When ramping up, one has more flexibility in selecting the regime as all stabilization strength values below actually fit within the frame's overscan. Further, in an increasing stabilization strength situation it may be beneficial to increase the stabilization strength to its maximum value or until it is just high enough where the current frame will not fit within its overscan; whereafter the strength may be decreased to that value which just permitted the frame to fit. Finally, after a current frame (see 106-110 and 118-122) and its future frames (see 112 and 130-136) have been evaluated and its stabilization strength modified as necessary, the current frame's image data (or metadata) may be updated in accordance with EQS. 2A and 2B (at this point S will be a fixed value) to reflect the determined stabilization motions, the current frame may be shifted out of the buffer system (e.g., buffer system 200) and stored (e.g., in storage 240), and each entry in frame buffer (e.g., frame buffer 205) and motion buffer (e.g., motion buffer 210) may be shifted (see 114) to make room for a new frame (e.g., new frame 220). Following shift and store (see 114), each successive video frame may be evaluated (e.g., via 116) until all frames in the current frame buffer 205 have been evaluated and stabilized (using motion data in motion buffer 210).

Figure 7:
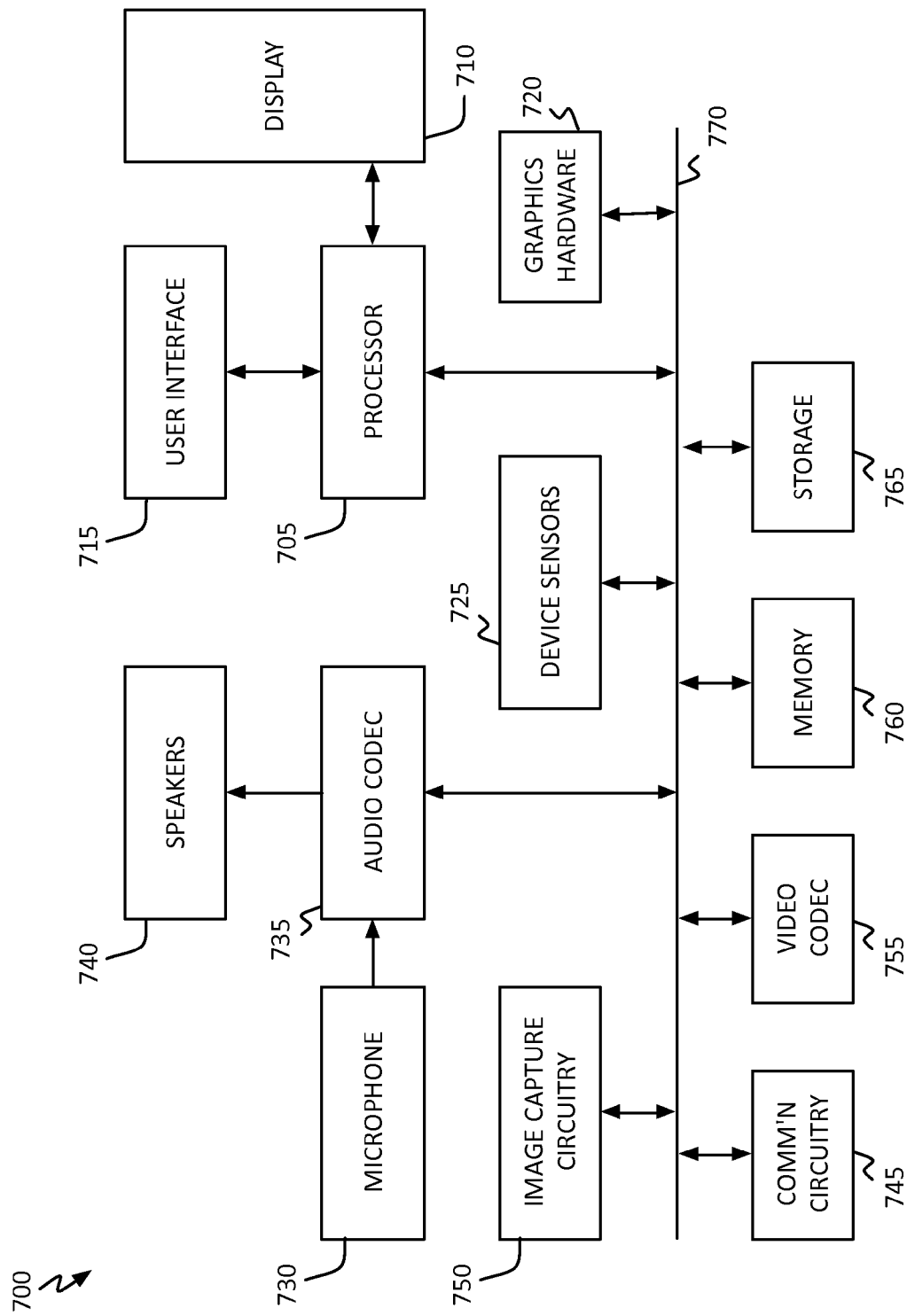
FIG. 7 shows, in block diagram form, a multi-function electronic device in accordance with one embodiment.

Referring to FIG. 7, a simplified functional block diagram of illustrative electronic device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, video codec(s) 755, memory 760, storage 765, and communications bus 770.

Processor 705 may execute instructions necessary to carry out or control the operation of many functions performed by device 700 (e.g., such as the generation and/or processing of video stream in accordance with FIGS. 1, 2, 5 and 6). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream. In one embodiment, display 710 may display a video stream as it is captured while processor 705 and/or graphics hardware 720 and/or image capture circuitry contemporaneously generate a stabilized version of the captured video stream storing the stabilized video stream in memory 760 and/or storage 765. In another embodiment, display 710 may display a stabilized version of a captured video sequence as it is captured (with a delay approximately equal to the buffer system initialization time (see 104 and FIGS. 2A and 2B)). Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs).

Image capture circuitry 750 may capture video images that may be processed to generate stabilized video in accordance with this disclosure. Output from image capture circuitry 750 may be processed, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language.

When executed by, for example, processor 705 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, various smoothing regimes may be used together. Further, FIGS. 1A-1B shows a flowchart illustrating a general video stabilization operation in accordance with the disclosed embodiments. In one or more embodiments, one or more of the disclosed steps may be omitted, repeated, and/or performed in a different order than that described herein. Accordingly, the specific arrangement of steps or actions shown in FIGS. 1A-1C should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors to:
    capture a first time-sequenced set of images, wherein each image in the first time-sequenced set of images has a capture time and motion information;
    select a current image from the first time-sequenced set of images, wherein the current image has a capture time that is before the capture time of each image in a second time-sequenced set of images, wherein the second time-sequenced set of images is a subset of the first time-sequenced set of images;
    identify a first stabilization metric value for the current image;
    determine the first stabilization metric value is not appropriate for a later-captured image from the second time-sequenced set of images;
    determine a second stabilization metric value for the later-captured image, wherein the first and second stabilization metric values are different;
    adjust the first stabilization metric value based on the second stabilization metric value, the later-captured image's motion information, the current image's motion information, and motion information from a plurality of the second time-sequenced set of images including the later-captured image;
    apply the adjusted first stabilization metric value to the current image to stabilize the current image; and
    store the stabilized current image in a memory.

2. The non-transitory program storage device of claim 1, wherein the instructions to cause the one or more processors to capture a first time-sequenced set of images comprise instructions to cause the one or more processors to:
    capture and buffer the current image; and
    capture and buffer each image in the second time-sequenced set of images.

3. The non-transitory program storage device of claim 1, further comprising instructions to cause the one or more processors to:
    identify a first image in the second time-sequenced set of images, wherein the first image's capture time is immediately after the current image's capture time and before every other image in the second time-sequenced set of images;
    identify a last image in the second time-sequenced set of images, wherein the last image's capture time is after every other image's capture time in the second time-sequenced set of images;
    remove the first image from the second time-sequenced set of images and identify it as a new current image;
    capture a new image, wherein the captured new image has a capture time and motion information, wherein the captured new image's capture time is immediately after the last image's capture time;
    include the captured new image in the second time-sequenced set of images;
    identify the adjusted first stabilization metric value as a third stabilization metric value for the new current image;
    determine the third stabilization metric value is not appropriate for a second later-captured image from the second time-sequenced set of images;
    determine a fourth stabilization metric value for the second later-captured image, wherein the third stabilization metric value and the fourth stabilization metric value are different;
    modify the third stabilization metric value based on the fourth stabilization metric value, the new current image's motion data and motion data from a plurality of the second time-sequenced set of images including the second later-captured image;
    apply the modified third stabilization metric value to the new current image to stabilize the new current image; and
    store the stabilized new current image in a memory.

4. The non-transitory program storage device of claim 1, further comprising instructions to cause the one or more processors to modify a stabilization metric value of each image in the second time-sequenced set of images that has a capture time after the current image's capture time and before the later-captured image's capture time based on the adjusted first stabilization metric value and the second stabilization metric value.

5. The non-transitory program storage device of claim 4, wherein the instructions to cause the one or more processors to modify comprise instructions to cause the one or more processors to modify the stabilization metric value of each image in the second time-sequenced set of images that has a capture time after the current image's capture time and before the later-captured image's capture time so as to create a smooth transition between the adjusted first stabilization metric value and the second stabilization metric value.

6. The non-transitory program storage device of claim 1, wherein:
    the first time-sequenced set of images further includes a first set of motion information, wherein each motion information in the first set of motion information has a corresponding capture time, wherein each motion information in the first set of motion information has a capture time corresponding to a capture time of an image in the first set of images, wherein the capture time of each motion information in the first set of motion information is before the current image's capture time; and
    the instructions to cause the one or more processors to adjust the first stabilization metric value comprise instructions to cause the one or more processors to adjust the first stabilization metric value based on the second stabilization metric value, the later-captured image's motion information, the current image's motion information, motion information from a plurality of the second time-sequenced set of images including the later-captured image, and motion information from the first set of motion information.

7. A video image stabilization method, comprising:
capturing a first time-sequenced set of images, each image in the first time-sequenced set of images having a capture time and motion information;
selecting a current image from the first time-sequenced set of images, the current image having a capture time that is before the capture time of each image in a second time-sequenced set of images, wherein the second time-sequenced set of images is a subset of the first time-sequenced set of images;
identifying a first stabilization metric value for the current image;
determining the first stabilization metric value is not appropriate for a later-captured image from the second time-sequenced set of images;
determining a second stabilization metric value for the later-captured image, wherein the first and second stabilization metric values are different;
adjusting the first stabilization metric value based on the second stabilization metric value, the later-captured image's motion information, the current image's motion information and motion information from a plurality of the second time-sequenced set of images including the later-captured image;
applying the adjusted first stabilization metric value to the current image to stabilize the current image; and
storing the stabilized current image in a memory.

8. The method of claim 7, further comprising:
capturing and buffer the current image; and
capturing and buffer each image in the second time-sequenced set of images.

9. The method of claim 7, further comprising:
identifying a first image in the second time-sequenced set of images, wherein the first image's capture time is immediately after the current image's capture time and before every other image in the second time-sequenced set of images;
identifying a last image in the second time-sequenced set of images, wherein the last image's capture time is after every other image's capture time in the second time-sequenced set of images;
removing the first image from the second time-sequenced set of images and identify it as a new current image;
capturing a new image, wherein the captured new image has a capture time and motion information, wherein the captured new image's capture time is immediately after the last image's capture time;
including the captured new image in the second time-sequenced set of images;
identifying the adjusted first stabilization metric value as a third stabilization metric value for the new current image;
determining the third stabilization metric value is not appropriate for a second later-captured image from the second time-sequenced set of images;
determining a fourth stabilization metric value for the second later-captured image, wherein the third stabilization metric value and the fourth stabilization metric value are different;
modifying the third stabilization metric value based on the fourth stabilization metric value, the new current image's motion data and motion data from a plurality of the second time-sequenced set of images including the second later-captured image;
applying the modified third stabilization metric value to the new current image to stabilize the new current image; and
storing the stabilized new current image in a memory.

10. The method of claim 7, further comprising modifying a stabilization metric value of each image in the second time-sequenced set of images that has a capture time after the current image's capture time and before the later-captured image's capture time based on the adjusted first stabilization metric value and the second stabilization metric value.

11. The method of claim 10, wherein modifying comprises modifying the stabilization metric value of each image in the second time-sequenced set of images that has a capture time after the current image's capture time and before the later-captured image's capture time so as to create a smooth transition between the adjusted first stabilization metric value and the second stabilization metric value.

12. The method of claim 7, wherein the first time-sequenced set of images further includes a first set of motion information, wherein each motion information in the first set of motion information has a corresponding capture time, wherein each motion information in the first set of motion information has a capture time corresponding to a capture time of an image in the first set of images, wherein the capture time of each motion information in the first set of motion information is before the current image's capture time.

13. The method of claim 12, further comprising adjusting the first stabilization metric value based on the second stabilization metric value, the later-captured image's motion information, the current image's motion information, motion information from a plurality of the second time-sequenced set of images including the later-captured image, and motion information from the first set of motion information.

14. A video image capture device, comprising:
image sensor;
memory communicatively coupled to the image sensor;
one or more motion sensors;
one or more processors operatively coupled to the image sensor, the memory and the one or more motion sensors configured to:
capture a first time-sequenced set of images with the image sensor and, contemporaneously for each image in the first time-sequenced set of images, obtain motion information from the one or more motion sensors, and a capture time;
select a current image from the first time-sequenced set of images, wherein the current image has a capture time that is before the capture time of each image in a second time-sequenced set of images, wherein the second time-sequenced set of images is a subset of the first time-sequenced set of images;
identify a first stabilization metric value for the current image;
determine the first stabilization metric value is not appropriate for a later-captured image from the second time-sequenced set of images;
determine a second stabilization metric value for the later-captured image, wherein the first and second stabilization metric values are different;
adjust the first stabilization metric value based on the second stabilization metric value, the later-captured image's motion information, the current image's motion information, and motion information from a plurality of the second time-sequenced set of images including the later-captured image;

apply the adjusted first stabilization metric value to the current image to stabilize the current image; and store the stabilized current image in the memory.

15. The video image capture device of claim 14, wherein the one or more processors are further configured to:

capture and buffer the current image in the memory; and capture and buffer each image in the second time-sequenced set of images in the memory.

16. The video image capture device of claim 14, wherein the one or more processors are further configured to:

identify a first image in the second time-sequenced set of images, wherein the first image's capture time is immediately after the current image's capture time and before every other image in the second time-sequenced set of images;

identify a last image in the second time-sequenced set of images, wherein the last image's capture time is after every other image's capture time in the second time-sequenced set of images;

remove the first image from the second time-sequenced set of images and identify it as a new current image;

capture a new image with the motion sensor, wherein the captured new image has a capture time and motion information obtained from the one or more motion sensors, wherein the captured new image's capture time is immediately after the last image's capture time;

include the captured new image in the second time-sequenced set of images;

identify the adjusted first stabilization metric value as a third stabilization metric value for the new current image;

determine the third stabilization metric value is not appropriate for a second later-captured image from the second time-sequenced set of images;

determine a fourth stabilization metric value for the second later-captured image, wherein the third stabilization metric value and the fourth stabilization metric value are different;

modify the third stabilization metric value based on the fourth stabilization metric value, the new current image's motion data and motion data from a plurality of the second time-sequenced set of images including the second later-captured image;

apply the modified third stabilization metric value to the new current image to stabilize the new current image; and store the stabilized new current image in the memory.

17. The video image capture device of claim 14, wherein the one or more processors are further configured to modify a stabilization metric value of each image in the second time-sequenced set of images that has a capture time after the current image's capture time and before the later-captured image's capture time based on the adjusted first stabilization metric value and the second stabilization metric value.

18. The video image capture device of claim 17, wherein the configuration to cause the one or more processors to modify, comprises a configuration to cause the one or more processors to modify the stabilization metric value of each image in the second time-sequenced set of images that has a capture time after the current image's capture time and before the later-captured image's capture time so as to create a smooth transition between the adjusted first stabilization metric value and the second stabilization metric value.

* * * * *